United States Patent
Boone et al.

(10) Patent No.: US 9,877,430 B2
(45) Date of Patent: Jan. 30, 2018

(54) PICKUP UNIT FOR AN AGRICULTURAL HARVESTING MACHINE HAVING REMOVABLE EXTENSION PLATES

(71) Applicant: CNH Industrial America LLC, New Holland, PA (US)

(72) Inventors: Wouter Boone, Ruiselede (BE); Karel Naeyaert, Oostkamp (BE)

(73) Assignee: CNH Industrial America LLC, New Holland, PA (US)

( * ) Notice: Subject to any disclaimer, the term of this patent is extended or adjusted under 35 U.S.C. 154(b) by 78 days.

(21) Appl. No.: 14/888,905

(22) PCT Filed: May 6, 2014

(86) PCT No.: PCT/EP2014/059240
§ 371 (c)(1),
(2) Date: Nov. 3, 2015

(87) PCT Pub. No.: WO2014/180848
PCT Pub. Date: Nov. 13, 2014

(65) Prior Publication Data
US 2016/0183469 A1    Jun. 30, 2016

(30) Foreign Application Priority Data

May 6, 2013 (BE) .................................. 2013/0307

(51) Int. Cl.
*A01D 39/00* (2006.01)
*A01D 43/02* (2006.01)
(Continued)

(52) U.S. Cl.
CPC ......... *A01D 89/001* (2013.01); *A01D 89/008* (2013.01); *A01F 15/042* (2013.01);
(Continued)

(58) Field of Classification Search
CPC .... A01D 89/008; A01D 61/008; A01D 41/10; A01F 15/106
(Continued)

(56) References Cited

U.S. PATENT DOCUMENTS 2,390,680 A * 12/1945 Ausherman ............ A01D 61/00
198/513
2,893,537 A * 7/1959 Krahn .................... A01D 41/10
198/512

(Continued)

FOREIGN PATENT DOCUMENTS

DE    3506461 A1    8/1986
DE    19750954 A1    3/1999
(Continued)

OTHER PUBLICATIONS

CLAAS Complete Large-Format Programme. Catalog. pp. 1-86. Harsewinkle, Germany.

*Primary Examiner* — Arpad Fabian-Kovacs
(74) *Attorney, Agent, or Firm* — Patrick M. Sheldrake (57) ABSTRACT

A pickup unit for an agricultural harvesting machine includes a frame; a pickup roll carried by the frame; and a feed assist roll carried by the frame and positioned adjacent to the pickup roll. The feed assist roll has a plurality of radially outwardly extending cleats spaced apart around a periphery thereof, and a plurality of extension plates. Each extension plate is removably attached to and extends a corresponding cleat.

16 Claims, 9 Drawing Sheets

(51) Int. Cl.
*A01D 75/00* (2006.01)
*A01D 89/00* (2006.01)
*A01F 15/10* (2006.01)
*A01F 15/04* (2006.01)

(52) U.S. Cl.
CPC .......... *A01F 15/044* (2013.01); *A01F 15/101* (2013.01); *A01F 2015/102* (2013.01)

(58) Field of Classification Search
USPC ........................................................ 56/341
See application file for complete search history.

(56) References Cited

U.S. PATENT DOCUMENTS

| | | | | | |
|---|---|---|---|---|---|
| 2,934,881 | A * | 5/1960 | Noble | ................... | A01D 61/008 198/513 |
| 3,324,639 | A * | 6/1967 | Halls | ................... | A01D 43/10 56/1 |
| 4,170,235 | A * | 10/1979 | Ashton | ................... | A01D 61/00 460/16 |
| 4,300,333 | A * | 11/1981 | Anderson | ................... | A01D 61/008 198/666 |
| 4,928,462 | A * | 5/1990 | Lippens | ................... | A01F 15/101 100/142 |
| 4,972,665 | A * | 11/1990 | Hicks | ................... | A01D 61/008 198/518 |
| 5,595,055 | A * | 1/1997 | Horchler, Jr. | ................... | A01D 90/02 100/88 |
| 5,848,523 | A * | 12/1998 | Engel | ................... | A01F 15/106 100/88 |
| 5,980,383 | A * | 11/1999 | Medley | ................... | A01D 61/008 460/114 |
| 6,093,099 | A * | 7/2000 | Groff | ................... | A01D 61/008 460/32 |
| 6,279,304 | B1 * | 8/2001 | Anstey | ................... | A01D 89/008 198/676 |
| 6,601,375 | B1 * | 8/2003 | Grahl | ................... | A01D 89/006 56/16.6 |
| 6,651,418 | B1 * | 11/2003 | McClure | ................... | A01F 15/106 56/341 |
| 6,874,311 | B2 * | 4/2005 | Lucand | ................... | A01F 15/106 56/341 |
| 6,948,300 | B1 * | 9/2005 | Bandstra | ................... | A01F 15/106 56/119 |
| 7,204,074 | B2 * | 4/2007 | Bandstra | ................... | A01D 89/008 56/341 |
| 7,694,504 | B1 * | 4/2010 | Viaud | ................... | A01D 90/04 56/341 |
| 8,056,314 | B1 * | 11/2011 | Anstey | ................... | A01F 15/106 56/364 |
| 8,376,126 | B1 | 2/2013 | Waerdt et al. | | |
| 8,381,503 | B2 * | 2/2013 | Roberge | ................... | A01F 15/106 56/341 |
| 8,621,835 | B2 * | 1/2014 | Bollig | ................... | A01D 45/021 56/119 |
| 9,578,806 | B2 * | 2/2017 | Weeks | ................... | A01D 61/008 |
| 2010/0242427 | A1 * | 9/2010 | Anstey | ................... | A01D 89/008 56/341 |
| 2016/0316628 | A1 * | 11/2016 | Farley | ................... | A01D 61/008 |

FOREIGN PATENT DOCUMENTS

EP 1252814 A1 10/2002
EP 1417879 A1 5/2004

* cited by examiner

PICKUP UNIT FOR AN AGRICULTURAL HARVESTING MACHINE HAVING REMOVABLE EXTENSION PLATES

This application is the US National Stage filing of International Application Serial No. PCT/EP2014/059240 filed on May 6, 2014 which claims priority to Belgian Application BE2013/0307 filed May 6, 2013, each of which is incorporated herein by reference in its entirety.

BACKGROUND OF THE INVENTION

1. Field of the Invention

The present invention relates to an agricultural harvesting machine, and, more particularly, to pickup units used on such harvesting machines.

2. Description of the Related Art

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

On a large square baler, a pickup unit at the front of the baler gathers the cut and windrowed crop material from the ground. The pickup unit includes a pickup roll, and optionally may include other components such as side shields, stub augers, wind guard, etc.

A packer unit is used to move the crop material from the pickup unit to a duct or pre-compression chamber. The packer unit forms a wad of crop within the pre-compression chamber which is then transferred to a main bale chamber. (for purposes of discussion, the charge of crop material within the pre-compression chamber will be termed a "wad", and the charge of crop material after being compressed within the main bale chamber will be termed a "flake"). Typically such a packer unit includes packer tines or forks to move the crop material from the pickup unit into the pre-compression chamber. Instead of a packer unit it is also known to use a rotor cutter unit which chops the crop material into smaller pieces.

A stuffer unit transfers the wad of crop material in charges from the pre-compression chamber to the main bale chamber. Typically such a stuffer unit includes sniffer forks which are used to move the wad of crop material from the pre-compression chamber to the main bale chamber, in sequence with the reciprocating action of a plunger within the main bale chamber.

In the main bale chamber, the plunger compresses the wad of crop material into flakes to form a bale and, at the same time, gradually advances the bale toward the outlet of the bale chamber. When enough flakes have been added and the bale reaches a full (or other predetermined) size, a number of knotters are actuated which wrap and tie twine, cord or the like around the bale while it is still in the main bale chamber. The twine is cut and the formed baled is ejected out the back of the baler as a new bale is formed.

With a large square baler as described above, it is also known to use a feed assist roll which is positioned above and slightly rearward from the pickup roll. Such a feed assist roll is effective at moving heavy crop material into the packing unit. However, with large volume windrows throughput through and blockage in front of the pickup unit can still be an issue.

What is needed in the art is a pickup unit for an agricultural harvesting machine such as a baler, a forage harvester, a cotton harvester, etc., which can handle normal throughput for most operating conditions, but is also easily configured to handle high throughput for some operating conditions.

SUMMARY OF THE INVENTION

The present invention provides a pickup unit with a feed assist roll having radially extending cleats, and extension plates which are removably attached to the cleats for use with specific types of crops.

The invention in one form is directed to a pickup unit for an agricultural harvesting machine such as a square baler, a round baler, a forage harvester, a cotton picker, etc. The pickup unit includes a frame; a pickup roll carried by the frame; and a feed assist roll carried by the frame and positioned adjacent to the pickup roll. The feed assist roll has a plurality of radially outwardly extending cleats spaced apart around a periphery thereof, and a plurality of extension plates. Each extension plate is removably attached to and extends a corresponding cleat.

In another form of the invention, each extension plate is generally T-shaped and includes a finger which extends radially further outward than a remainder of the extension plate.

The invention in yet another form is directed to an agricultural baler including a packer unit having a plurality of packer tines, and a pickup unit including a pickup roll and a feed assist roll positioned adjacent to the pickup roll. The feed assist roll has a plurality of radially outwardly extending cleats spaced apart around a periphery thereof, and a plurality of extension plates. Each extension plate is removably attached to and extends a corresponding cleat. Each extension plate has at least a portion thereof which is positioned between adjacent packer tines during operation.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 10 is a front view of one of the extension plates shown in FIG. 9. Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
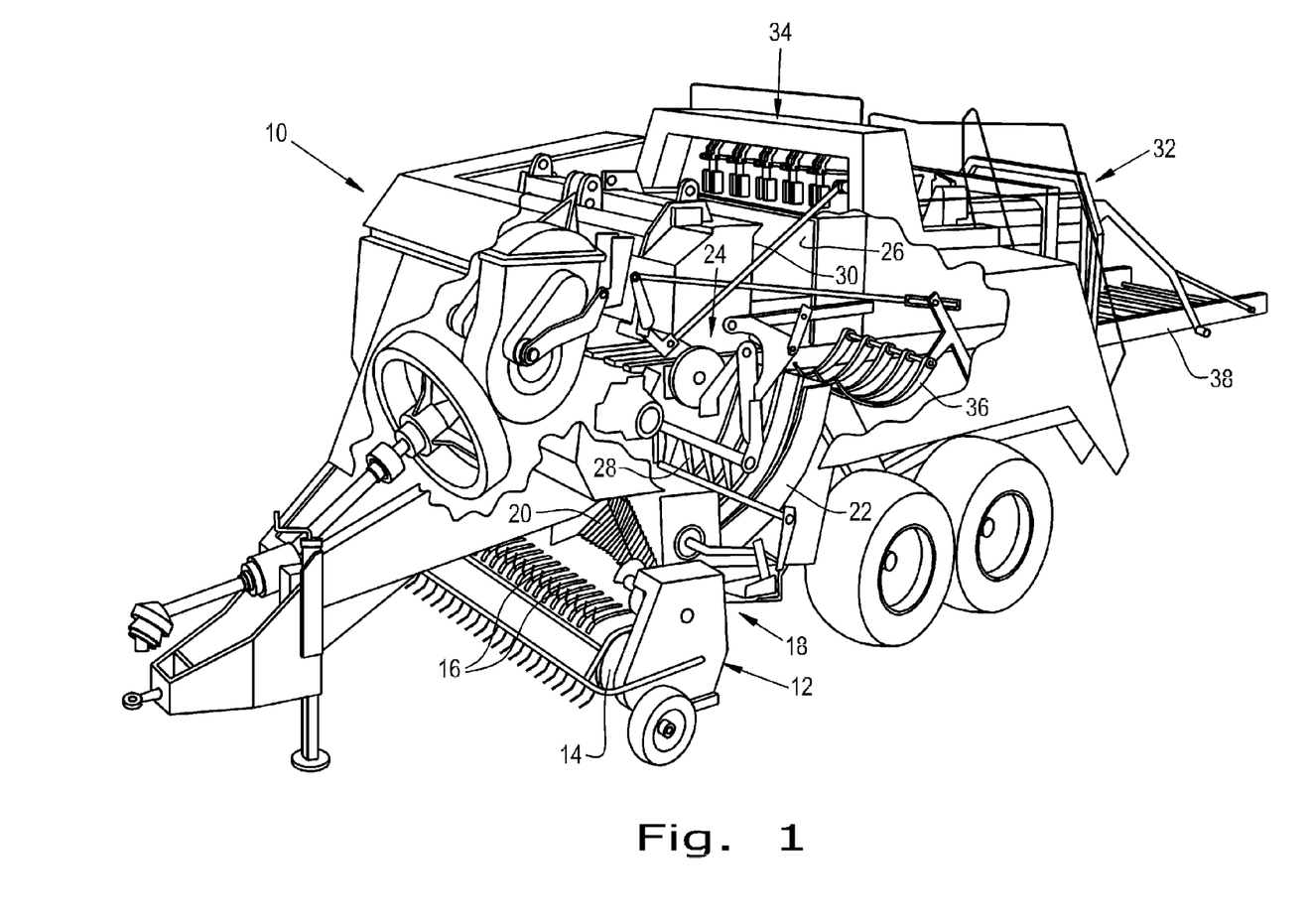
FIG. 1 is a perspective cutaway view showing the internal workings of a large square baler, with which the pickup unit of the present invention may be used.
Figure 2:
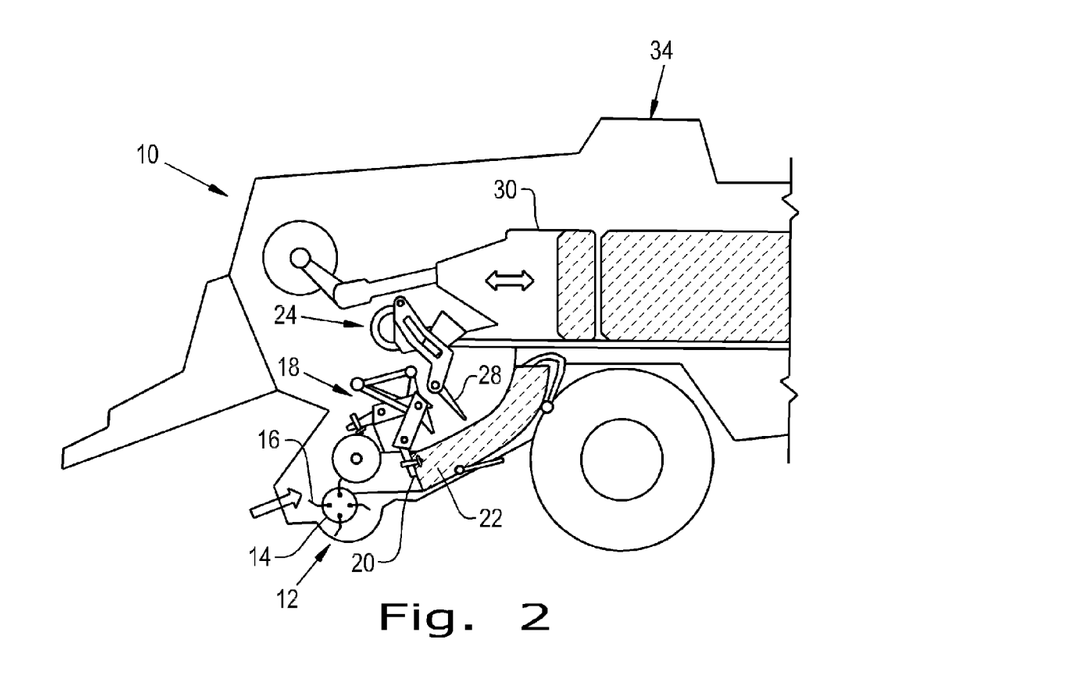
FIGS. 2 and 3 are schematic illustrations showing the formation of a bale within the large square baler of FIG. 1.
Figure 3:
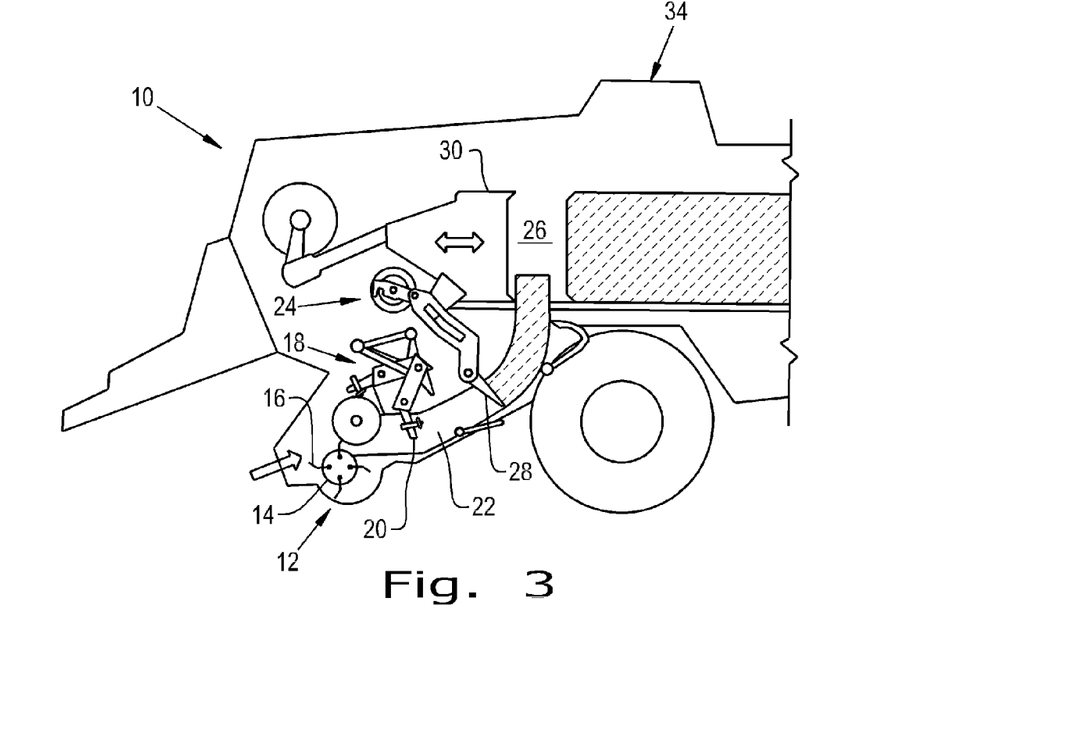

Referring now to the drawings, and more particularly to FIGS. 1-3, there is shown an agricultural harvesting machine in the form of a large square baler 10. FIG. 1 is a perspective cutaway view showing the internal workings of a large square baler 10, and FIGS. 2 and 3 are schematic illustrations showing the formation of a bale within baler 10. In the specific embodiment shown, the baler 10 is a New Holland BB960 which is manufactured and sold by the assignee of the present invention. However, the agricultural harvesting machine of the present invention could be in the form of a different type of harvester, such as a round baler, a forage harvester, a cotton picker, etc., using a pickup unit to pickup crop material from a field.

Baler 10 operates on a two stage feeding system. Crop material is lifted from windrows into the baler 10 using a pickup unit 12. The pickup unit 12 includes a rotating pickup roll 14 with tines 16 which move the crop rearward toward a packer unit 18. An optional pair of stub augers (one of which is shown, but not numbered) are positioned above the pickup roll 14 to move the crop material laterally inward. The packer unit 18 includes packer tines 20 which push the crop into a pre-compression chamber 22 to form a wad of crop material. The packer tines 20 intertwine the crop together and pack the crop within the pre-compression chamber 22. Pre-compression chamber 22 and packer tines 20 function as the first stage for crop compression. Once the pressure in the pre-compression chamber 22 reaches a predetermined sensed value, a stuffer unit 24 moves the wad of crop from the pre-compression chamber 22 to a main bale chamber 26. The stuffer unit 24 includes stuffer forks 28 which thrust the wad of crop directly in front of a plunger 30, which reciprocates within the main bale chamber 26 and compresses the wad of crop into a flake. Stuffer forks 28 return to their original stationary state after the wad of material has been moved into the main bale chamber 26. Plunger 30 compresses the wads of crop into flakes to form a bale and, at the same time, gradually advances the bale toward outlet 32 of main bale chamber 26. Main bale chamber 26 and plunger 30 function as the second stage for crop compression. When enough flakes have been added and the bale reaches a full (or other predetermined) size, knotters 34 are actuated which wrap and tie twine around the bale while it is still in the main bale chamber 26. Needles 36 bring the lower twine up to the knotters 34 and the tying process then takes place. The twine is cut and the formed bale is ejected from a discharge chute 38 as a new bale is formed.

Figure 4:
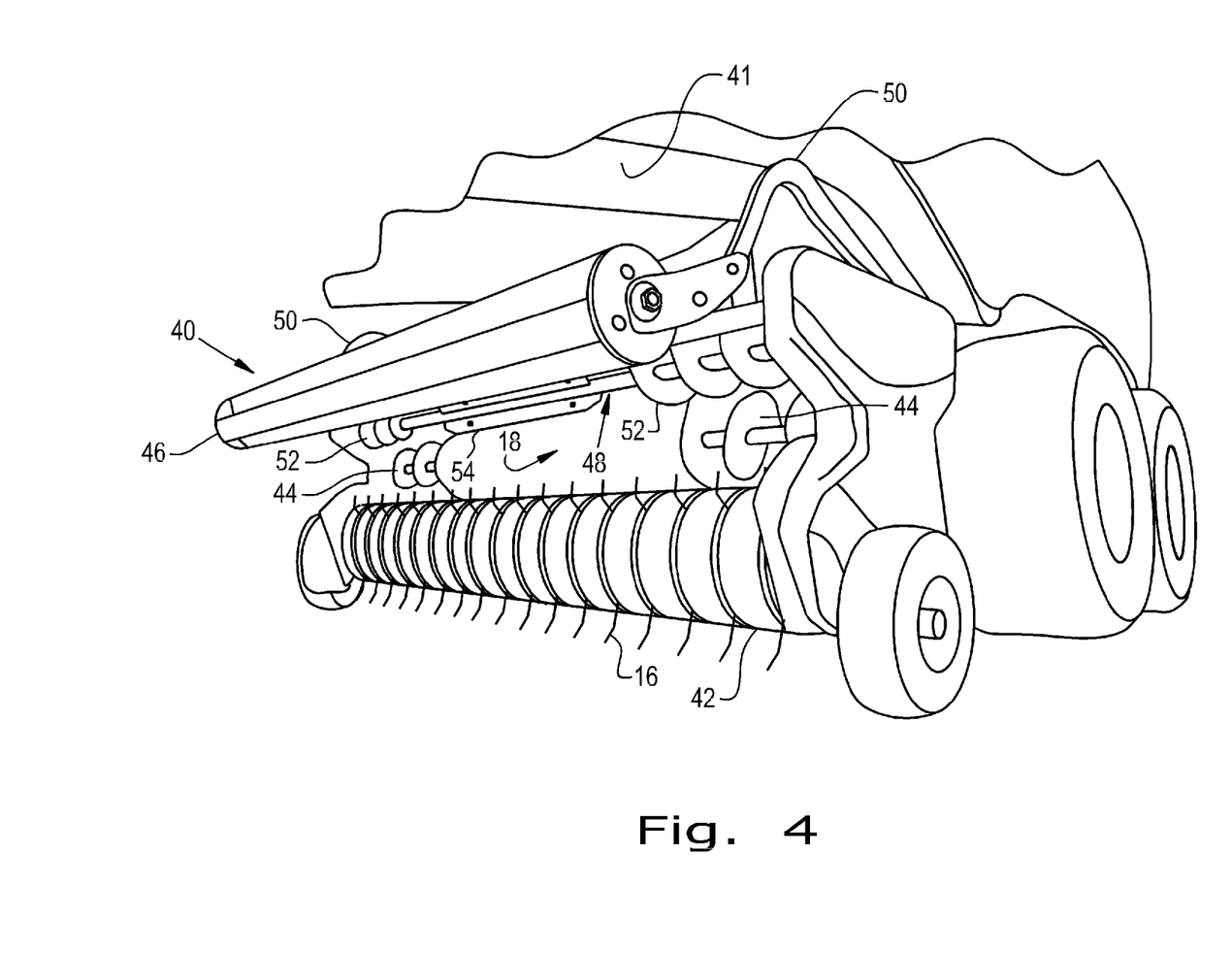
FIG. 4 is a front perspective view of a pickup unit of the present invention, with the extension plates of the present invention removed.

Referring now to FIG. 4, there is shown an embodiment of a pickup unit 40 of the present invention. Pickup unit 40 is carried by frame 41 of the baler and includes a pickup roll 42 and stub augers 44, similar to pickup unit 12 shown in FIG. 1. However, pickup unit 40 differs from pickup unit 12 in that it includes a roller wind guard 46 and a feed assist roll 48. The roller wind guard 46 is generally hexagonal shaped in cross-section, and is mounted to the outboard ends of arms 50. The roller wind guard 46 is lowered to a position just above the windrow during operation to inhibit winds from affecting the pickup operation using pickup roll 42.

Feed assist roll 48 is positioned above and rearward from pickup roll 42, and extends across the working width of pickup unit 40. The feed assist roll 48 has a pair of counter-rotating auger flightings 52 at the longitudinal outboard ends which urge the crop material laterally inward from the sides of pickup unit 40. Feed assist roll 48 also includes a plurality of cleats 54 which are equidistantly spaced around a periphery of the feed assist roll 48. Cleats 54 have a length which is much less than the overall length of the feed assist roll 48 and are positioned laterally inward of each auger flighting 52. Cleats 54 can have a rectangular, square or other cross-sectional shape, depending upon the application. Cleats 54 are positioned in front of the packer unit 18 and urge the crop material toward the packer unit 18.

Under most operating conditions, the feed assist roll 48, including cleats 54, is effective to move the crop material rearward into the packer unit 18. However, for large volume and low density windrows, the crop material may still bunch up in front of the pickup unit 40.

Figure 5:
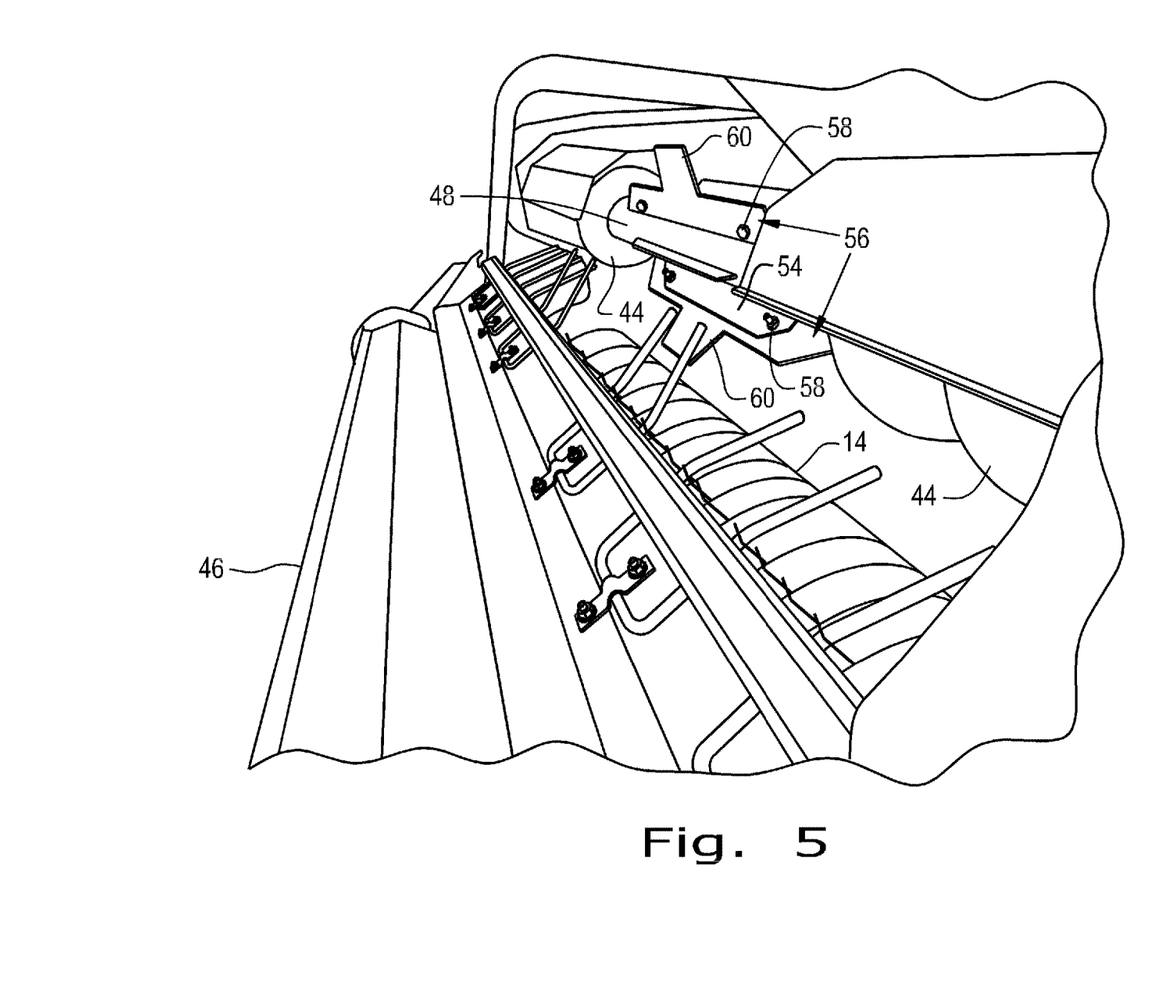
FIG. 5 is a fragmentary perspective view of the pickup unit shown in FIG. 4, with the extension plates of the present invention installed.
Figure 6:
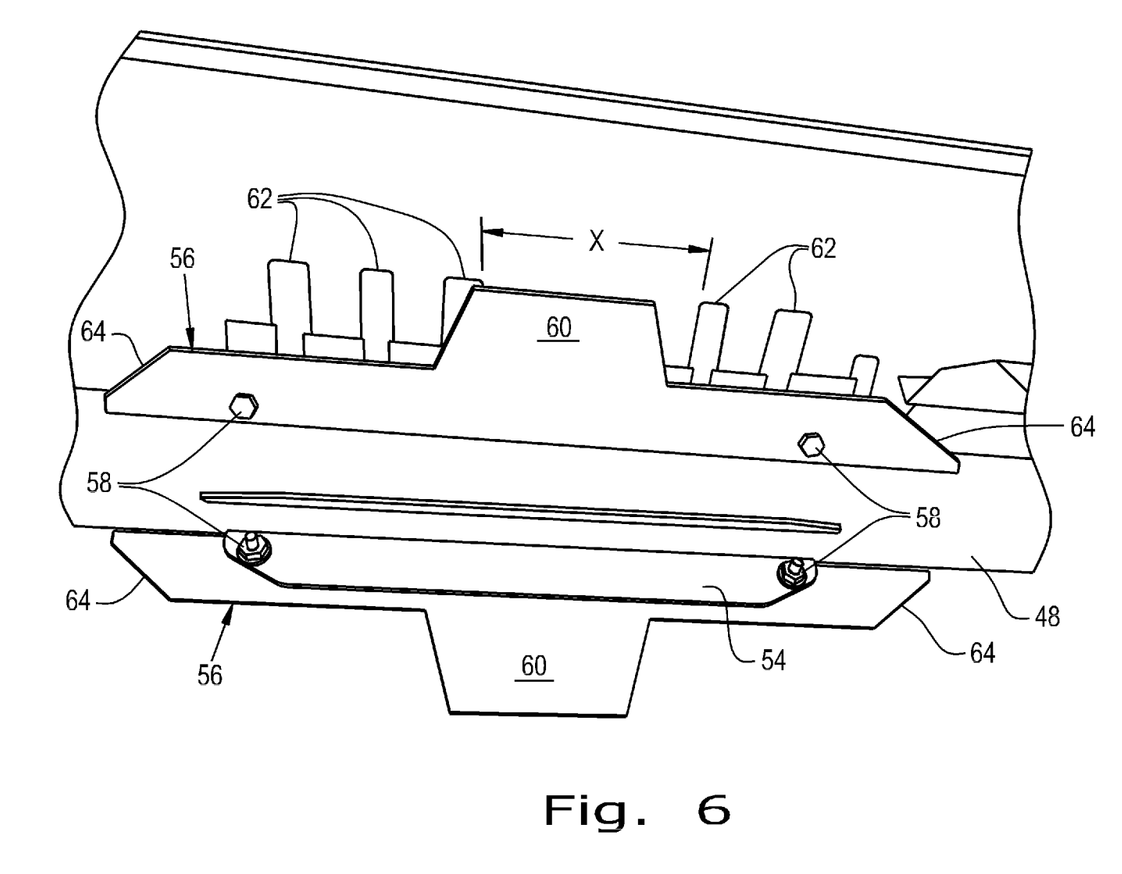
FIG. 6 is a fragmentary top perspective view of the pickup unit shown in FIGS. 4 and 5.
Figure 7:
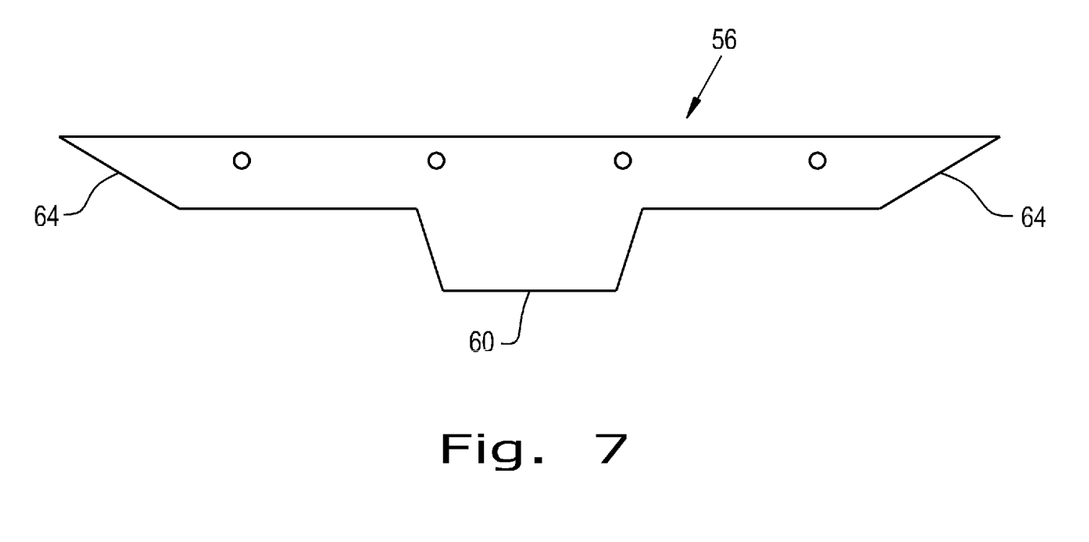
FIG. 7 is a front view of the extension plate shown in FIGS. 4-6.

According to an aspect of the present invention, and referring now to FIGS. 5-7, extension plates 56 may optionally be attached to cleats 54 of the feed assist roll 48. Extension plates 56 provide the dual functionality of preventing a blockage of crop in front of pickup unit 40, as well as also functioning as an additional packer in the area between the packer tines of packer unit 18.

Each extension plate 56 is generally T-shaped and is removably attached to and extends a corresponding cleat 54 in at least one direction, and preferably extends the attached cleat in multiple directions. Extension plates 56 have a height (in a direction radially outward from the feed assist roll 48) which is slightly greater than the height of the cleat 54 to which it is removably attached using fasteners, such as bolts 58. Between a set of packer tines (which extend through slots 62 shown in FIG. 6) there is a distance of approximately 120 mm where the packer tines do not move the crop into the pre-compression chamber. In the area between the packer tines, denoted by the distance X in FIG. 6, extension plates 56 include a finger 60 with a height which is much greater and extends between the packer tines during rotation. These long fingers 60 assist as an additional packer of the crop material in the area between the packer tines.

Extension plates 56 also have a length in the longitudinal direction of the feed assist roll 48 which is greater than the corresponding attached cleat 54. In this manner, each extension plate 56 extends the corresponding cleat 54 in opposite longitudinal directions toward the auger flightings 52. Extension plates 56 may have beveled longitudinal ends 64 at each end thereof, which may be desirable for certain applications.

During harvesting of the crop material, the feed assist roll 48 can be used without extension plates 56 under most crop conditions. Extension plates 56 can be easily attached to or removed from the cleats 54 by using fastening devices such as bolts 58, rivets, or systems using a snap fit arrangement. For high volume crops such as wheat with considerable stem growth, extension plates 56 can easily be added to the cleats 54 to extend the effective dimension of cleats 54 in one or more directions. The fingers 60 form an additional packer for the high volume crop (in addition to the packer tines of the packer unit).

Figure 8:
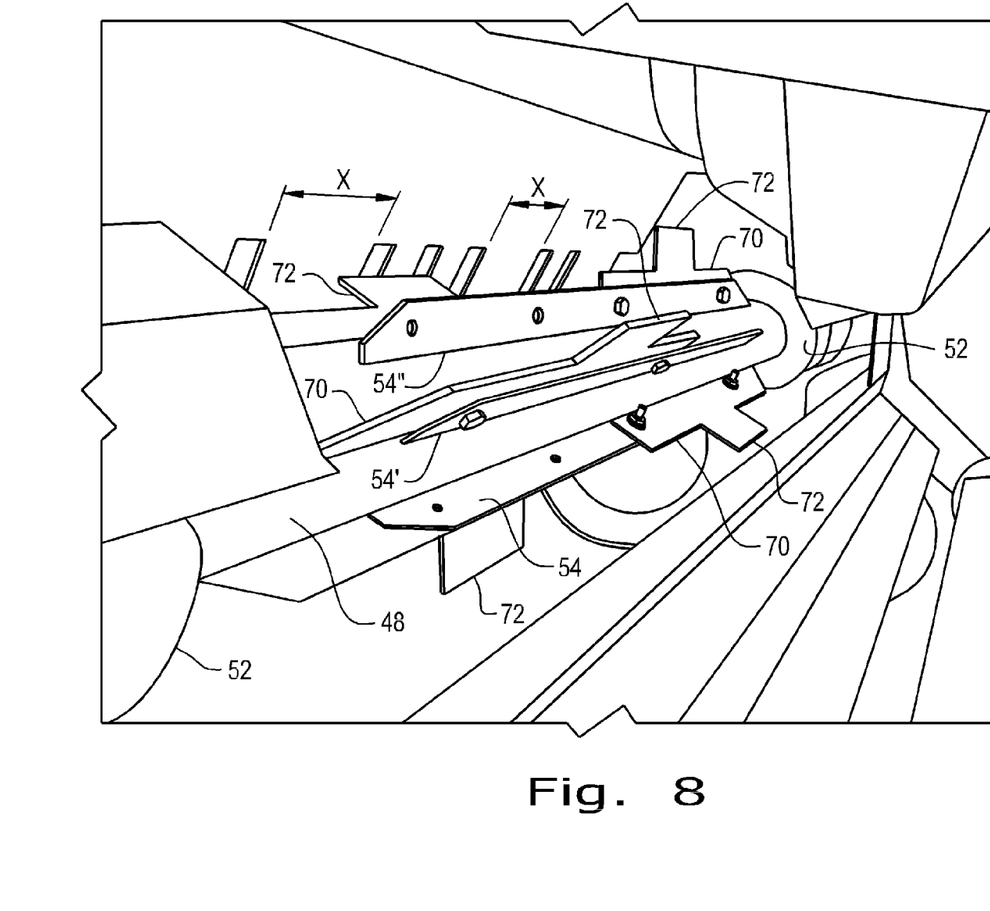
FIG. 8 is a fragmentary front perspective view of another embodiment of a pickup unit of the present invention.

Referring now to FIG. 8, there is shown another embodiment of an extension plate 70 of the present invention, which may be attached to the cleats of the feed assist roll 48 of the pickup unit. In the embodiment of the extension plate 70 shown in FIG. 8, each extension plate 70 has a length in the longitudinal direction of feed assist roll 48 which is less than the cleat 54 to which it is removably attached. Each extension plate 70 is attached to the corresponding cleat 54 so that it extends past one of the longitudinal ends of the attached cleat 54. The extension plates 70 are successively staggered to extend from one end of one cleat 54 and an opposite end of an adjacent cleat 54'. In this manner, the overall effective length of cleats 54 is increased. Each extension plate 70 has a finger 72 which is aligned with and has a width less than a distance between adjacent packer tines, again denoted by the reference X in FIG. 7. Although FIG. 8 shows only one extension plate 70 attached on each cleat 54, 54', 54", it is possible to attach multiple extension plates on the same cleat 54. Likewise, it is also possible to only attach one or more extension plates 70 to every other, every second, third, etc. cleat 54, 54', 54".

Figure 9:
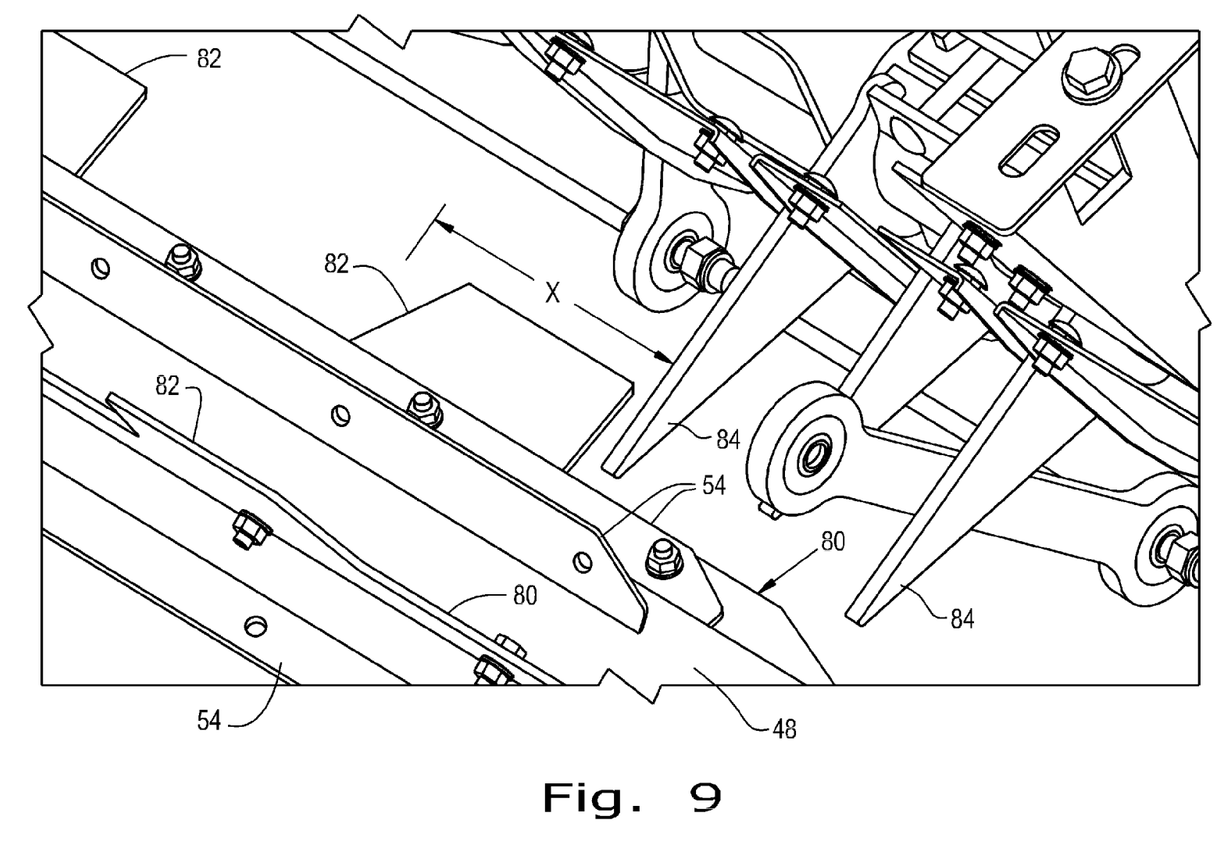
FIG. 9 is a fragmentary perspective view of yet of another embodiment of a pickup unit of the present invention, shown relative to the packer tines.
Figure 10:
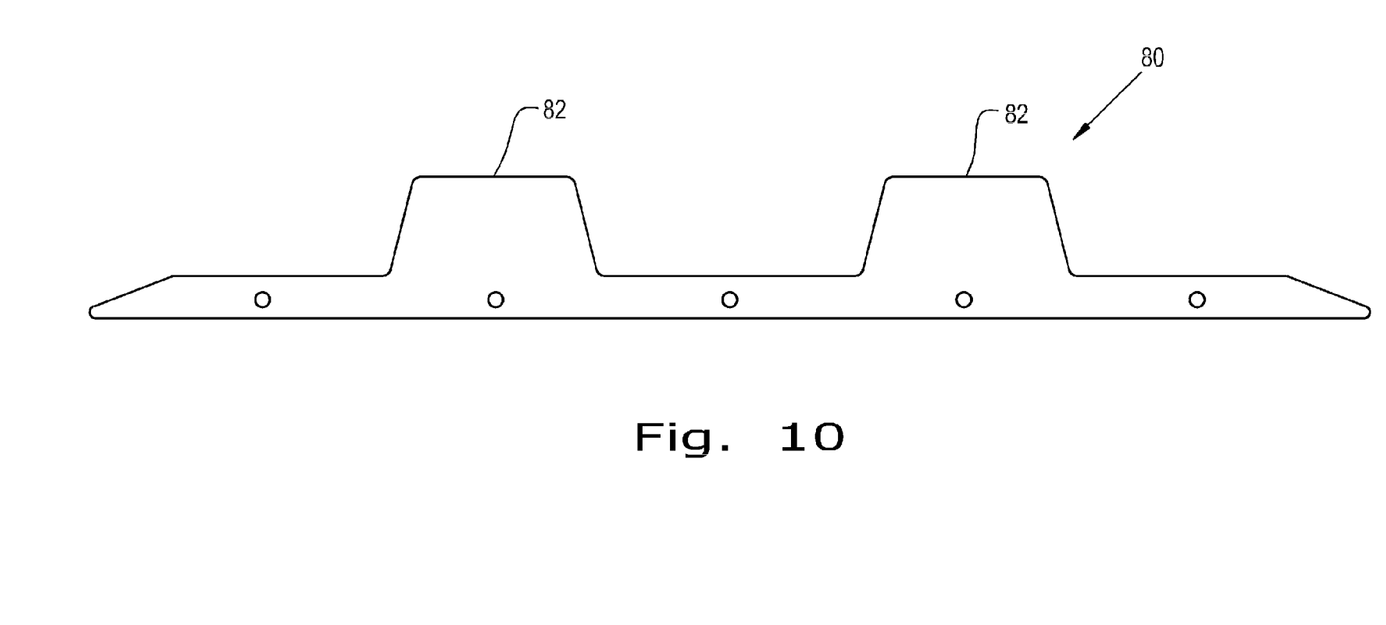

Referring now to FIGS. 9 and 10, there is shown yet another embodiment of an extension plate 80 of the present invention which may be attached to cleats 54 of a feed assist roll 48. Extension plates 80 have two fingers 82, each of which are sized and positioned to rotate between adjacent packer tines 84. Each extension plate 80 has an overall length which is greater than a corresponding cleat 54 to which it is attached; thus extending the length of the cleat 54 in opposite longitudinal directions. Likewise, it is possible to have an extension plate 80 with an overall length which is less than the corresponding cleat 54 to which it is attached, thus only increasing the height in the area between the packer tines and thus only functioning as an additional packer of crop material in the area between the packer tines. The extension plates 80 are shown attached to every other cleat 54 in FIG. 9; however, it is also possible to removably attach extension plates 80 to each cleat 54, or every second, third, fourth, etc. cleat 54.

It has been noticed that the maximum effect of the extension plates 56, 70, 80 is accomplished if the extension plates extend the corresponding cleat 54 in two directions, being an increase in height in the direction radially outward from the feed assist roll 48 and an increase in length in the longitudinal direction of the feed assist roll 48.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A baler comprising:
a frame;
a bale chamber connected to the frame;
a pickup unit, where the pickup unit is positioned to feed the baler chamber;
the pickup unit comprising:
a pickup roll carried by said frame; and
a feed assist roll carried by said frame and positioned adjacent said pickup roll, said feed assist roll having a plurality of radially outwardly extending cleats spaced apart around a periphery thereof, and at least one extension plate, each said extension plate being removably attached to and extending from a corresponding said cleat in at least one direction and,
wherein each said extension plate extends radially outward from a corresponding said cleat and includes a finger which extends radially further outward from a corresponding said cleat than a remainder of said extension plate.

2. The baler of claim 1, wherein each said extension plate is generally T-shaped.

3. The baler of claim 1, wherein each said cleat has a length which is less than a length of said feed assist roll and is positioned approximately midway between opposite ends of said feed assist roll, and each said extension plate extends longitudinally past a corresponding said cleat.

4. The baler of claim 3, wherein each said extension plate has a length which is less than a length of a corresponding said cleat, and said plurality of extension plates are successively staggered to extend from one end of one cleat and an opposite end of an adjacent cleat.

5. The baler of claim 4, wherein each said extension plate has a beveled end which extends past a corresponding said cleat.

6. The baler unit of claim 1, wherein each said cleat has a length which is less than the length of said feed assist roll and is positioned approximately midway between opposite ends of said feed assist roll.

7. The baler unit of claim 1, wherein the at least one extension plate has at least one beveled longitudinal end.

8. The baler unit of claim 1, wherein the at least one extension plate is bolted to the corresponding said cleat.

9. An agricultural baler, comprising:
a packer unit including a plurality of packer tines; and
a pickup unit including a pickup roll and a feed assist roll positioned adjacent said pickup roll, said feed assist roll having a plurality of radially outwardly extending cleats spaced apart round a periphery thereof, and at least one extension plate, each said extension plate being removably attached to and extending a corresponding said cleat in at least one direction, each said extension plate having at least a finger portion thereof which is positioned between adjacent said packer tines during operation.

10. The agricultural baler of claim 9, wherein said feed assist roll is positioned above and rearwardly from said pickup roll.

11. The agricultural baler of claim 9, wherein each said extension plate extends radially outward from a corresponding said cleat.

12. The agricultural baler of claim 11, wherein each said cleat has a length which is less than a length of said feed assist roll and is positioned approximately midway between opposite ends of said feed assist roll, and each said extension plate extends longitudinally past a corresponding said cleat.

13. The agricultural baler of claim 12, wherein each said extension plate has a length which is less than a length of a corresponding said cleat, and said plurality of extension plates are successively staggered to extend from one end of one cleat and an opposite end of an adjacent cleat.

14. The agricultural baler of claim 13, wherein each said extension plate has a beveled end which extends past a corresponding said cleat.

15. The agricultural baler of claim 9, wherein each said extension plate is generally T-shaped.

16. The agricultural baler of claim 9, wherein said feed assist roll is positioned above and rearwardly from said pickup roll.

* * * * *